US012591056B2

(12) United States Patent
Meyer et al.

(10) Patent No.: US 12,591,056 B2
(45) Date of Patent: Mar. 31, 2026

(54) SYSTEM AND METHOD FOR GENERATING A POINT CLOUD BASED UPON RADAR DATA

(71) Applicant: GM Cruise Holdings LLC, San Francisco, CA (US)

(72) Inventors: Michael Meyer, Munich (DE); Marc Unzueta Canals, Munich (DE); Kalin Hristov Kabakchiev, Munich (DE); Jessica Bartholdy Sanson, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 366 days.

(21) Appl. No.: 18/469,491

(22) Filed: Sep. 18, 2023

(65) Prior Publication Data

US 2025/0085416 A1 Mar. 13, 2025

(30) Foreign Application Priority Data

Sep. 13, 2023 (EP) ..................................... 23197199

(51) Int. Cl.
*G01S 13/89* (2006.01)
*G01S 13/931* (2020.01)

(52) U.S. Cl.
CPC ............ *G01S 13/89* (2013.01); *G01S 13/931* (2013.01)

(58) Field of Classification Search
CPC ........ G01S 13/865; G01S 13/18; G01S 13/89; G01S 13/931; G01S 7/417; G01S 13/867; G01S 17/86; G01S 17/89; G01S 17/931;

G01S 7/4802; B60W 2420/403; B60W 2420/408; B60W 2554/402; B60W 2554/4041; B60W 2754/70; B60W 30/0956; G05D 1/249; G06T 7/292; G06T 7/30; G06T 7/60; G06V 20/58
See application file for complete search history.

(56) References Cited

U.S. PATENT DOCUMENTS

| | | | |
|---|---|---|---|
| 2021/0150230 A1* | 5/2021 | Smolyanskiy | G06V 10/803 |
| 2021/0156960 A1* | 5/2021 | Popov | G01S 7/2955 |
| 2023/0135659 A1 | 5/2023 | Wu | |

(Continued)

FOREIGN PATENT DOCUMENTS

EP 3832341 A1 6/2021

OTHER PUBLICATIONS

"Extended European Search Report for European Patent Application No. 23197199.5", Mailed Date: Dec. 4, 2023, 11 pages.

(Continued)

*Primary Examiner* — Timothy A Brainard
(74) *Attorney, Agent, or Firm* — CANTOR COLBURN LLP

(57) ABSTRACT

The technologies described herein relate to computing a point cloud based upon data output by several radar sensors in a distributed radar system. The radar sensors generate tensors based upon echo signals detected by the radar sensors. Values are extracted from the tensors and a sequence of tokens is created, where the sequence of tokens includes the values extracted from the tensors. The sequence of tokens is provided as input to a transformer model, which outputs a point cloud based upon the sequence of tokens.

20 Claims, 8 Drawing Sheets

(56) References Cited

U.S. PATENT DOCUMENTS

2023/0237783 A1    7/2023   Banerjee et al.

OTHER PUBLICATIONS

European Office Action for European Application No. 231971995.; dated Oct. 29, 2025; 7 pages.
Vaswani Ashish et al: "Attention is All You Need", Jun. 12, 2017, XP093045849, Retrieved from the Internet: URL: https://arxiv.org/pdf/1706.03762.pdf [retrieved on May 10, 2023], 15 pages.

* cited by examiner

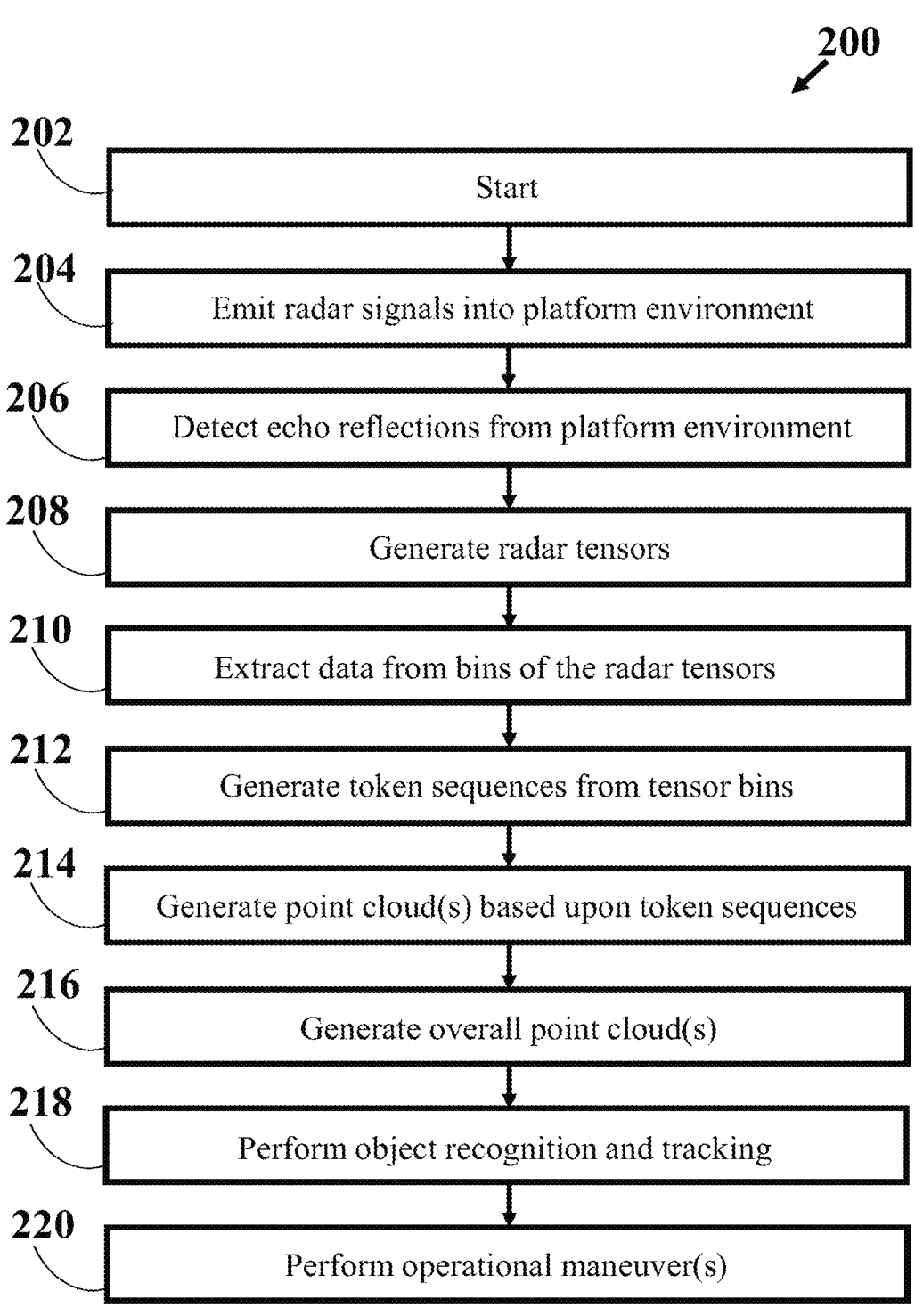

200

202 — Start

204 — Emit radar signals into platform environment

206 — Detect echo reflections from platform environment

208 — Generate radar tensors

210 — Extract data from bins of the radar tensors

212 — Generate token sequences from tensor bins

214 — Generate point cloud(s) based upon token sequences

216 — Generate overall point cloud(s)

218 — Perform object recognition and tracking

220 — Perform operational maneuver(s)

FIG. 8

SYSTEM AND METHOD FOR GENERATING A POINT CLOUD BASED UPON RADAR DATA

RELATED APPLICATION

This application claims priority to European Patent Application No. EP23197199.5, filed on Sep. 13, 2023, and entitled "SYSTEM AND METHOD FOR GENERATING A POINT CLOUD BASED UPON RADAR DATA". The entirety of this application is incorporated herein by reference.

BACKGROUND

In connection with detecting and tracking objects in an environment, a platform, such as a vehicle, may be equipped with a radar sensor system that includes radar sensors. Radar sensors, continuously, near continuously, or at predefined intervals, emit radar signals into an environment that surrounds the platform. The radar signals reflect off objects in the environment and antennas of the radar sensors detect the reflected radar signals. The beamforming resolution of the radar sensor is generally proportional to size of the aperture of the radar sensor. To increase the overall beamforming resolution of a radar sensor system of the platform, multiple radar sensors may be distributed on and around the platform, thereby increasing size of the aperture. Conventionally, data from each of the distributed radar sensors is processed by local processing circuitry to generate radar data. For example, multiple radar sensors may be distributed on and around the platform with each radar sensor oriented in a different direction in an attempt to achieve radar coverage that encompasses substantially all of the environment immediately surrounding the platform.

The platform may also include or be otherwise coupled with a centralized processing device that receives data generated by the radar sensors and performs a variety of different tasks, such as controlling mechanical systems of the platform based upon data generated by the radar sensos. More specifically, the centralized processing device processes data generated by the distributed radar sensors substantially simultaneously and, for example, can control a steering system, a braking system, a propulsion system, etc. of an autonomous vehicle (AV) based upon the data generated by the radar sensos.

However, processing radar data generated by multiple different radar sensors (to improve beamforming resolution) in distributed radar scenarios using conventional methods is difficult and may be subject to error, as merging radar data output by different radar sensors requires that distances between the radars sensors is precisely known and constant. Operation of the platform, however, may cause one or more radar sensors to shift or otherwise move, such as due to vibrations of the platform, such that relative positions of the radar sensors changes over time, resulting in errors when the radar data generated by multiple different radar sensors is processed. Further, merging radar data from multiple distributed radar sensors conventionally requires specific radar hardware, such as a common oscillator or use of an optical signal for sensor synchronization (increasing design complexity and/or cost).

SUMMARY

The following is a brief summary of subject matter that is described in greater detail herein. This summary is not intended to be limiting as to scope of the claims.

Various technologies related to generating a point cloud based upon output of several radar sensors of a distributed radar system are described herein. A distributed radar system includes multiple radar sensos, where the multiple radar sensors include a first radar sensor and a second radar sensor. The radar sensors substantially simultaneously generate tensors, where the tensors include several bins that have values that correspond to range gates, Doppler gates, azimuth gates, and so forth. For example, for a given range-Doppler bin for a tensor generated by the first radar sensor, the bin includes a value that is indicative of a likelihood that a target exists at the range and is further indicative of Doppler information (if any) for such target at the range.

With respect to a first tensor generated by the first radar sensor, first values are extracted from the first tensor and placed in a sequence, thereby creating a first sequence of values. With respect to a second tensor generated by the second radar sensor (where the second tensor is generated at approximately the same time as the first tensor), second values are extracted from the second tensor and placed in a sequence, thereby creating a second sequence of values. Each of the first sequence and the second sequence can also include a positional embedding that identifies that the first sequence corresponds to the first radar sensor and the second sequence corresponds to the second radar sensor.

The first sequence and the second sequence are provided as input to a transformer-based model, and such model generates a point cloud based upon the two sequences. In an example, the transformer-based model can be trained using LIDAR data as ground-truth data, and therefore the transformer-based model can output a point cloud based upon the first and second radar tensors, where the point cloud has a resolution that matches resolution of the LIDAR point clouds upon which the transformer-based model has been trained.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 8 is a flow diagram illustrating a method for generating a point cloud based upon a sequence of tokens based upon radar sensor data from distributed radar sensors and performing an operational maneuver of a platform based upon detected radar signals.

DETAILED DESCRIPTION

Figure 1:
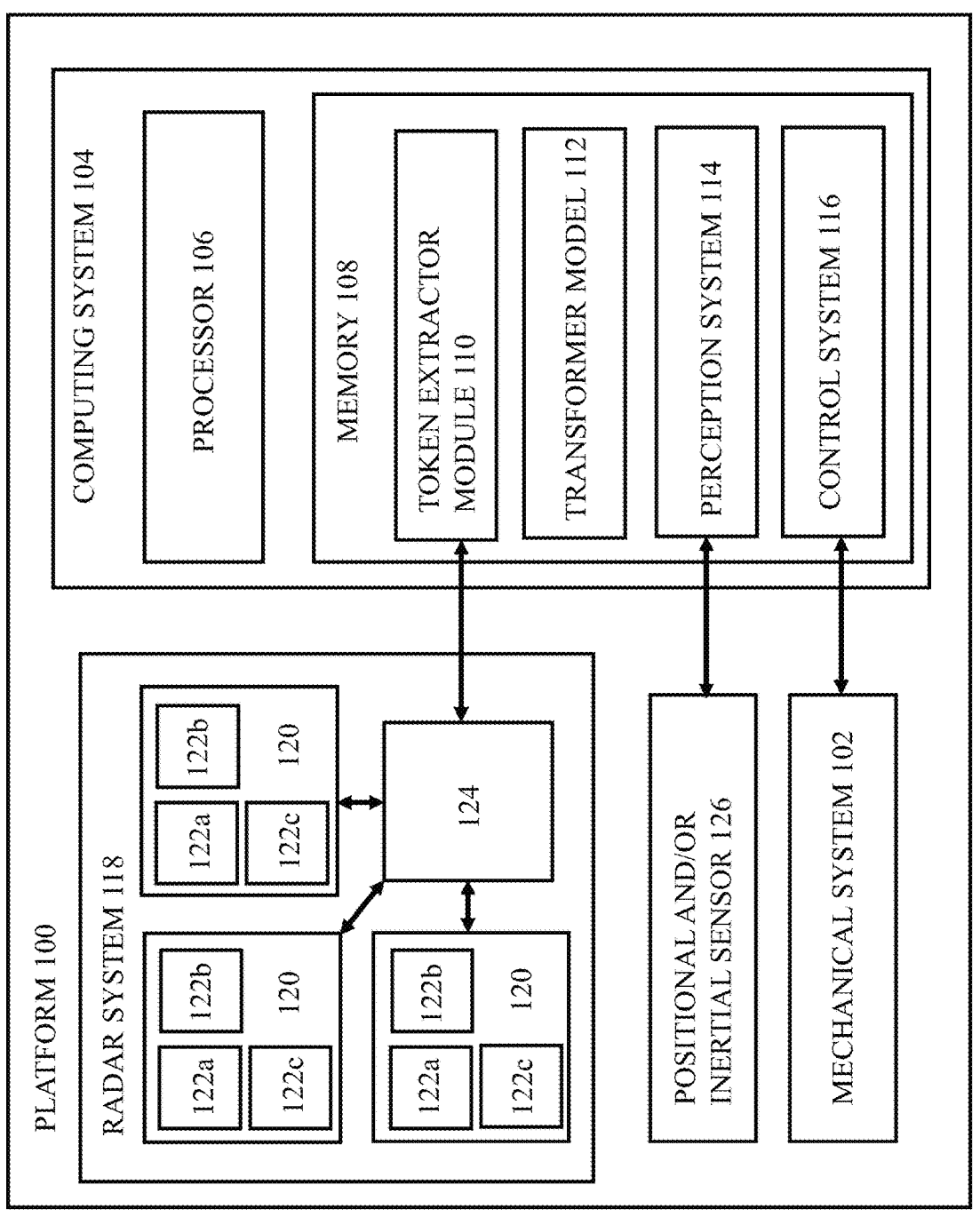
FIG. 1 is a schematic that illustrates a platform that includes a distributed radar sensor system, a computing system, and a mechanical system.

Various technologies pertaining to a distributed radar system and processing radar signals generated by such radar system are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to computing a point cloud for an environment surrounding a platform, such as a vehicle, based upon the output of two or more radar sensors coupled to the platform and then using such point cloud to, for example, control a mechanical system of the platform. The platform includes a computing system and a radar system with multiple radar sensors on or otherwise coupled with the platform. The radar sensors each generate tensors based upon detected echo signals (reflections of the emitted radar signals) that have reflected from surfaces of the environment surrounding the platform. The generated tensors include values for range-Doppler bins for the detected echo signals. The generated tensors may also include other values, for example, such as values for range-velocity bins, values for range-azimuth bins, values for range-cross-track angle bins, values for Doppler-velocity bins, etc. The radar sensors transmit the tensors to a computing system of the platform, where the computing system of the platform generates a point cloud indicative of the environment surrounding the platform based upon the radar tensors. More specifically, a token extractor module of the computing system receives the tensors and generates a sequence of tokens for each tensor, the sequence of tokens corresponding to values of bins of the tensors. The sequences of tokens are provided as input to a transformer model executed by the computing system, and the transformer model generates a point cloud based upon the sequences of tokens. The point cloud may be provided to a perception system executed by the computing system, where the perception system performs object recognition and tracking. Based upon such object recognition and tracking, the computing system can control a mechanical system of the platform such that the platforms an operational maneuver, including, but not limited to, accelerating, decelerating, braking, turning, steering, reversing, or stopping.

The technologies described herein exhibit various advantages over conventional distributed radar technologies, as the transformer-based model adapts to variations in radar sensor system positions caused by vibration. In contrast, conventional technologies require precise and constant knowledge of relative positions of radar sensor systems-typically, an initial measurement is taken and that measurement is assumed to remain constant, resulting in suboptimal merging of radar data from different sensor systems.

Referring now to FIG. 1, a platform 100 is illustrated. The platform 100 can be a vehicle (e.g., a car, a truck, a van, etc.), an autonomous vehicle (AV), a drone, a plane, a helicopter, an amphibious aircraft or floatplane, a biplane, a glider, a gyroplane, a tiltrotor, a blimp, a hot air balloon, or other suitable platform, or may be a component affixed to, disposed on, or otherwise couplable with any of the above. The platform 100 includes a mechanical system 102, a computing system 104, and a radar system 118. The mechanical system 102 is used in connection with operating, steering, or otherwise maneuvering the platform 100 and may include a propulsion system, a steering system, a braking system, and/or the like. The mechanical system 102 may also include a fuel system, a pneumatic or hydraulic system, an electrical system, a lubrication system, a heating and cooling system, a cabin control system, a communication system, a suspension system, and/or other similar auxiliary system compatible with the platform 100. While the platform 100 has been described as including the mechanical system 102, the computing system 104, and the radar system 118, it will be understood that the platform 100 may have other configurations. For example, the platform 100 may include the computing system 104 and the radar system 118 and be coupled with another platform with a mechanical system, such as a vehicle or any of the other platforms discussed above.

The platform 100 may optionally include a positional and/or inertial sensor 126. The positional and/or inertial sensor 126 is configured to generate an output indicative of the position or movement of the platform 100, such as the acceleration, velocity, orientation, latitudinal/longitudinal coordinates, and/or the like. The positional and/or inertial sensor 126 may be any sensor capable of determining the position and/or movement of the platform 100. For example, the positional and/or inertial sensor 126 may be a global positioning system (GPS) receiver, an inertial measurement unit (IMU), accelerometer, gyroscope, or other suitable sensor, or any combination thereof. The positional and/or inertial sensor 126 can transmit the output to the computing system 104.

While illustrated as a single system, it is to be understood that the computing system 104 may be a distributed system. Thus, for instance, several devices may be in communication by way of a network connection and may collectively perform tasks described as being performed by the computing system 104.

Figure 2:
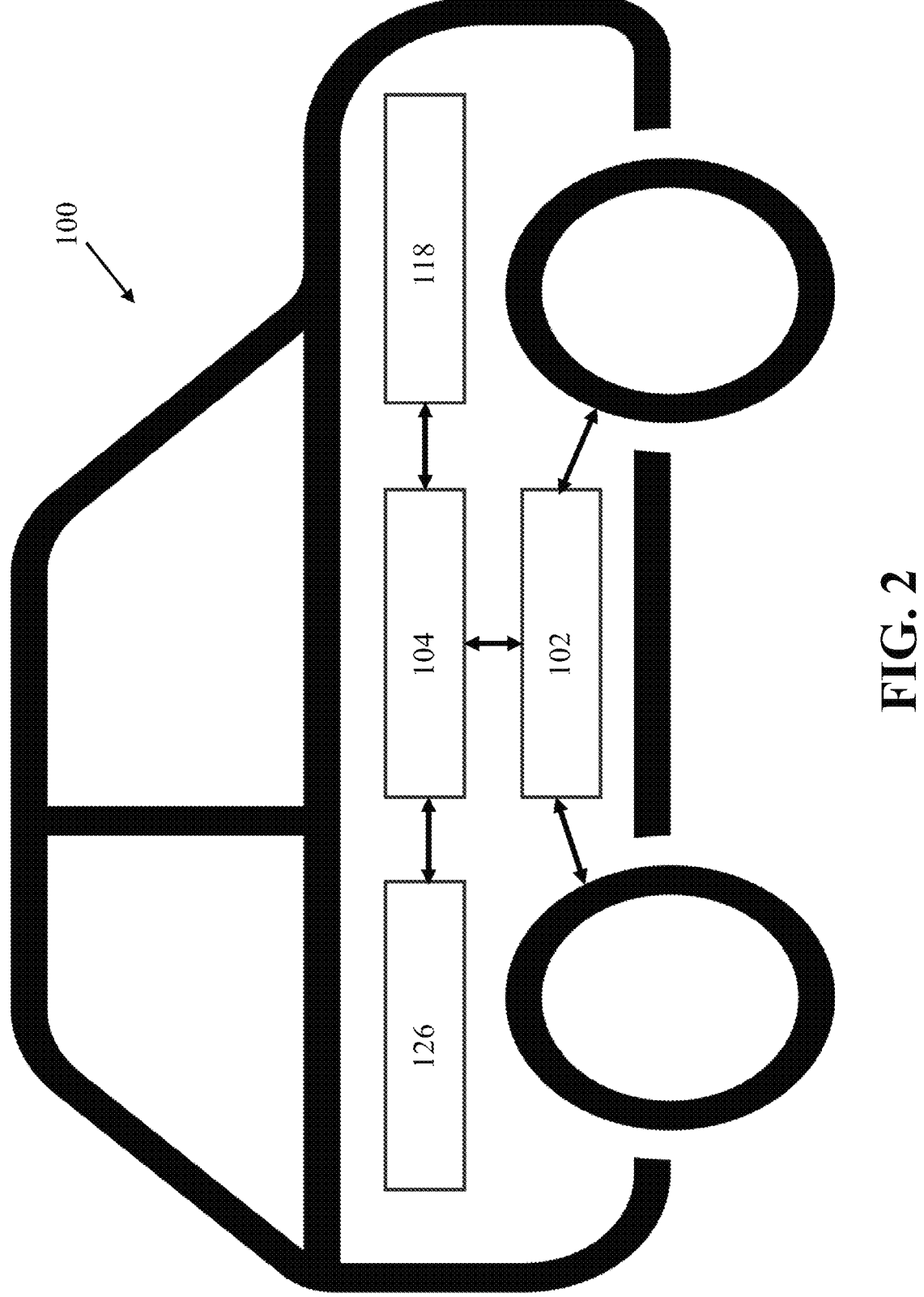
FIG. 2 is a schematic that illustrates an embodiment of the platform of FIG. 1 in which the platform is a vehicle.

As shown in FIG. 2, the platform 100 is a vehicle, such as a car, a truck, a van, a tractor, a golfcart, a tank, a forklift, a bulldozer, a roller, or the like. The mechanical system 102 of the platform 100 of FIG. 2 is configured to operate, drive, and/or maneuver the platform 100 and may include a propulsion system (e.g., a combustion engine, an electric motor), a drive train (e.g., clutch, gearbox, transmission, shaft, axles), a traction system (e.g., wheels, tires, tracks), a steering system (e.g., steering column, racks, tire rods), and/or a braking system (e.g., disc brakes, drum brakes). For example, the mechanical system 102 may be configured to control the orientation and/or operation of one or more wheels to control one or more operations of the platform 100. While illustrated as a vehicle, it is to be understood that the platform 100 may be a jet, a cargo plane, an amphibious aircraft or floatplane, a biplane, a glider, a gyroplane, a helicopter, a tiltrotor, a blimp, a hot air balloon, a drone, or other suitable vehicle, or a component affixed to, disposed on, or otherwise couplable with any of the above and the mechanical system 102 may be correspondingly configured to operate the platform 100. In embodiments in which the platform 100 is an aircraft, it will be understood that the mechanical system 102 may be configured to operate, land, and/or maneuver the platform 100 and may include a propulsion system (e.g., an engine, a turbine, a propeller, etc.), a lift/descent system (e.g., wings, elevators), a steering system (e.g., tillers, ailerons, a rudder, stabilators), a stability augmentation system, a landing system (e.g., wheels, landing gears, etc.), and a braking system.

The computing system 104 is configured to compute a multi-dimensional representation of an environment surrounding the platform 100 (and can compute other operational states, such as velocity, acceleration, and so forth), operate the platform 100, and/or maneuver or otherwise control operation of the platform 100 in the environment. The multi-dimensional representation of the environment surrounding the platform 100 may be in the form of a point cloud with one or more points representative of points (e.g., surfaces) in the environment from which emitted radar signals are reflected.

Turning back to FIG. 1, the computing system 104 includes a processor 106 that executes instructions that are stored in a memory 108. The memory 108 has a token extractor module 110 loaded therein that is configured to generate sequences of tokens based upon outputs of the radar system 118. The memory 108 also has a transformer model 112 loaded therein that is configured to generate one or more point cloud(s) (multi-dimensional representation) of the environment surrounding the platform 100) based upon the sequences of tokens generated by the token extractor module 110. The memory 108 further has a perception system 114 loaded therein that is configured to perform object recognition and tracking based upon the point cloud (s) generated by the transformer model 112. Further, the computing system 104 may also include a control system 116 loaded therein that is configured to output a command to the mechanical system 102 of the platform 100 based upon the object recognition and tracking performed by the perception system 114, such that the platform 100 performs an operational maneuver, including, but not limited to, accelerating, decelerating, braking, turning, steering, reversing, or stopping based upon the command. While not shown, the computing system 104 may also include or be in communication with a data store in communication with the processor 106, where the data store can include known positional information pertaining to the environment (e.g., a digital map for the environment in which the platform 100 is operating) and/or known historical information pertaining to the radar system 118.

The radar system 118 is configured to generate outputs based upon detected radar signals that (e.g., that have reflected off of objects) in the environment of the platform

100. The radar system 118 includes two or more radar sensors 120 distributed on and around the platform 100. The radar sensors 120 may emit radar signals into the environment surrounding the platform 100 and detect echo signals (reflections of emitted radar signals) that have reflected from one or more surfaces in the environment of the platform 100 and generate output in the form of data tensors (described in greater detail below). The radar system 118 and/or the radar sensors 120 may be any suitable commercially available radar system/sensor or radar systems or sensors already distributed on/around the platform 100.

Each radar sensor 120 may include several antennas 122a-122c, where the antennas 122a-122c include a transmitting antenna and a receiving antenna (or a single antenna that operates as both a transmitter and receiver). A transmitting antenna emits radar signals into an environment of the platform 100 and a receiving antenna is configured to detect echo signals reflected from a surface of the environment (reflections of the radar signals emitted by the transmitting antenna). The radar system 118 and/or the radar sensors 120 may generate tensors that include values for range bins based upon the detected echo signals. For example, the radar sensors 120 may be range-Doppler radars configured to compute values for range-Doppler bins in data tensors output by the radar sensor 120; thus, the radar sensors 120 can compute range measurements and Doppler measurements, where Doppler measurements are assigned to range measurements. Further, the radar sensors 120 may be optionally configured to generate other measurements based upon detected echo signals, such as cross-track angle measurements, which can be assigned to the range and/or Doppler measurements. For example, the radar system 118 may include one or more radar sensors 120 that are range-Doppler-angle radars configured to detect the cross-track angle for the detected echo signals reflected from the environment. The radar system 118 and/or the radar sensors 120 may also be configured to compute measurements of other variables based upon the detected echo signals reflected from the environment, such as velocity, angular, and/or azimuth data.

The radar system 118 may include processing circuitry 124 in communication with the antennas 122a-122c of the radar sensors 120. While the processing circuitry 124 is depicted in FIG. 1 as corresponding to several different radar sensors, it is to be understood that each radar sensor 120 can include an instantiation of the processing circuitry 124. The processing circuitry 124 may be configured to receive electrical representations of the detected echo signals from the receiving antenna and generate a radar tensor based upon the detected echo signals. The generated radar tensors may be M-dimensional based on the variables measured in the detected echo signals, where M is the number of variables measured in the detected echo signals. For example, the processing circuitry 124 may be configured to generate tensors having values for range, Doppler, and/or cross-track angle bins based upon the electrical representations of the detected echo signals. The processing circuitry 124 may also be configured to generate tensors with other bins based upon the electrical representations of the detected echo signals.

Each radar sensor 120 may be distributed (e.g., positioned and/or oriented) on or around the platform 100 to detect objects in a substantially different portion of the environment surrounding the platform 100 than the other radar sensor(s) 120 (with or without overlap). The radar sensors 120 of the radar system 118 may be distributed on and around the platform 100 in any suitable manner and configuration. For example, the radar system 118 may include a suitable number of radar sensors 120 and the radar sensors 120 may be distributed on and around the platform 100 such that the radar sensors 120 of the radar system 118 emit and detect radar signals into substantially the entirety of the environment surrounding the platform 100.

The radar system 118 and/or the radar sensors 120 may be any suitable type of radar system and/or radar sensors. For example, the radar system 118 and/or the radar sensors 120 may be a monopulse radar system/sensor, a continuous wave (CW) radar system/sensor (including a frequency modulated continuous wave (FMCW) radar system, or an unmodulated CW radar system), or a pulsed radar system/sensor. Additionally, the radar system 118 and/or the radar sensors 120 may include one or more filters such that nearby communication frequencies, such as 5G broadband cellular communication frequencies, do not interfere with the operation of the radar system 118 and/or radar sensors 120.

In the illustrated embodiment, the radar system 118 includes three radar sensors 120. However, it will be understood that the radar system 118 may include any suitable number of radar sensors 120. For example, the radar system 118 may include two, three, or more than four radar sensors 120. Further, while not illustrated, the platform 100 may also include a LIDAR sensor system, an ultra-sonic sensor system, an infrared sensor, and/or other suitable sensor systems.

Further, the processing circuitry 124 of the radar system 118 and/or the radar sensors 120 may assign an encoded identifier to each of the tensors, where the encoded identifier is representative of the radar sensor 120 which generated the tensor. Alternatively, the token extractor module 110 may assign an encoded identifier to the sequence of tokens, where the encoder is representative of the radar sensor 120 which generated the tensor. The encoder identifiers may also include a time stamp representative of the time the tensor was generated.

The radar sensors 120 of the radar system 118 (via transmitting antennas 122a-c) irradiate an area around the platform 100 (an environment the platform 100 is operating in) with radar signals. The irradiated area extends substantially around (e.g., laterally around, above, and/or below) the platform 100 to substantially cover the environment in which the platform 100 is operating. The radar sensors 120 may be positioned and/or oriented to irradiate a different portion of the environment in which the platform 100 is operating. The radar sensors 120 each detect radar signals (echo signals via receiving antennas 122a-c) that reflect from surfaces in the portion of the environment irradiated by the radar sensor 120. The portion of the environment irradiated by each radar sensor 120 may have any suitable shape (when the surface is flat and perpendicular to the radar sensor 120) including, but not limited to, circular, elliptical, oval, or egg-shaped.

As described above, the processing circuitry 124 of the radar system 118 computes tensors (also referred to as data cubes) corresponding to the detected echo signals. The processing circuitry 124 may generate N tensors, where N is the number of receiving antennas 122a-c in the radar system 118 and each tensor may be M-dimensional, where M is the number of variables measured in the echo signals detected by the particular antenna 122a-c. In generating the tensor, the processing circuitry 124 may be configured to generate an M-dimensional map, matrix, or the like containing M-number of measured values based upon the echo signals detected and measured by each antenna 122a-c, such as a measured values corresponding to the range (distance), Doppler, and cross-track angle for each detected echo signal. For example, when the tensor includes range-Doppler bins, the tensor can be represented as a two-dimensional image. Optionally, the processing circuitry 124 of the radar system 118 may assign an encoded identifier to each tensor corresponding to the time, radar sensor 120, and/or antenna 122a-c from which the tensor was generated.

The processing circuitry 124 transmits the N-number of tensors to the token extractor module 110 of the computing system 104. The token extractor module 110 is configured to generate one or more sequences of tokens based upon each tensor received from the processing circuitry 124. The sequences of tokens are values corresponding to the bins of the radar tensor or a portion of the radar tensor. The number of tensor bins and the ranges of radar values may be the same for each tensor generated from the echo signals detected by the antennas 122a-c of the radar sensors 120. With respect to range bins, each bin corresponds to a particular distance range (e.g., 0-5 meters, 5-10 meters, 10-15 meters, 15-20 meters, and so forth). For example, the token extractor module 110 may extract values from range-Doppler bins and treat each of such values as a token; therefore, a value in the 0-5 range bin is a first token, a value in the 5-10 range bin is a second token, etc. The token extractor module 110 is then configured to generate sequences of tokens based upon the values extracted from the tensor bins.

The token extractor module 110 of the computing system 104 may be configured to assign an encoded identifier to each of sequences of tokens, where the encoded identifier corresponds to one or more of the time, radar sensor 120, and/or antenna 122a-c from which the tensor was generated. The token extractor module 110 may also be configured to include bin-identifying information in the encoded identifier, where the bin-identifying information corresponds to the tensor bins that correspond to the sequence of tokens. For example, where the tensors include range-Doppler measurements, the bin-identifying information may correspond to the range of range (distance) values and/or Doppler values corresponding to the tensor bins used to generate the sequence of tokens, and where the tensors include range-Doppler-cross-track angle measurements, the bin-identifying information may correspond to the range of range values, Doppler values, and/or cross-track angle values used to generate the sequence of tokens.

Figure 3:
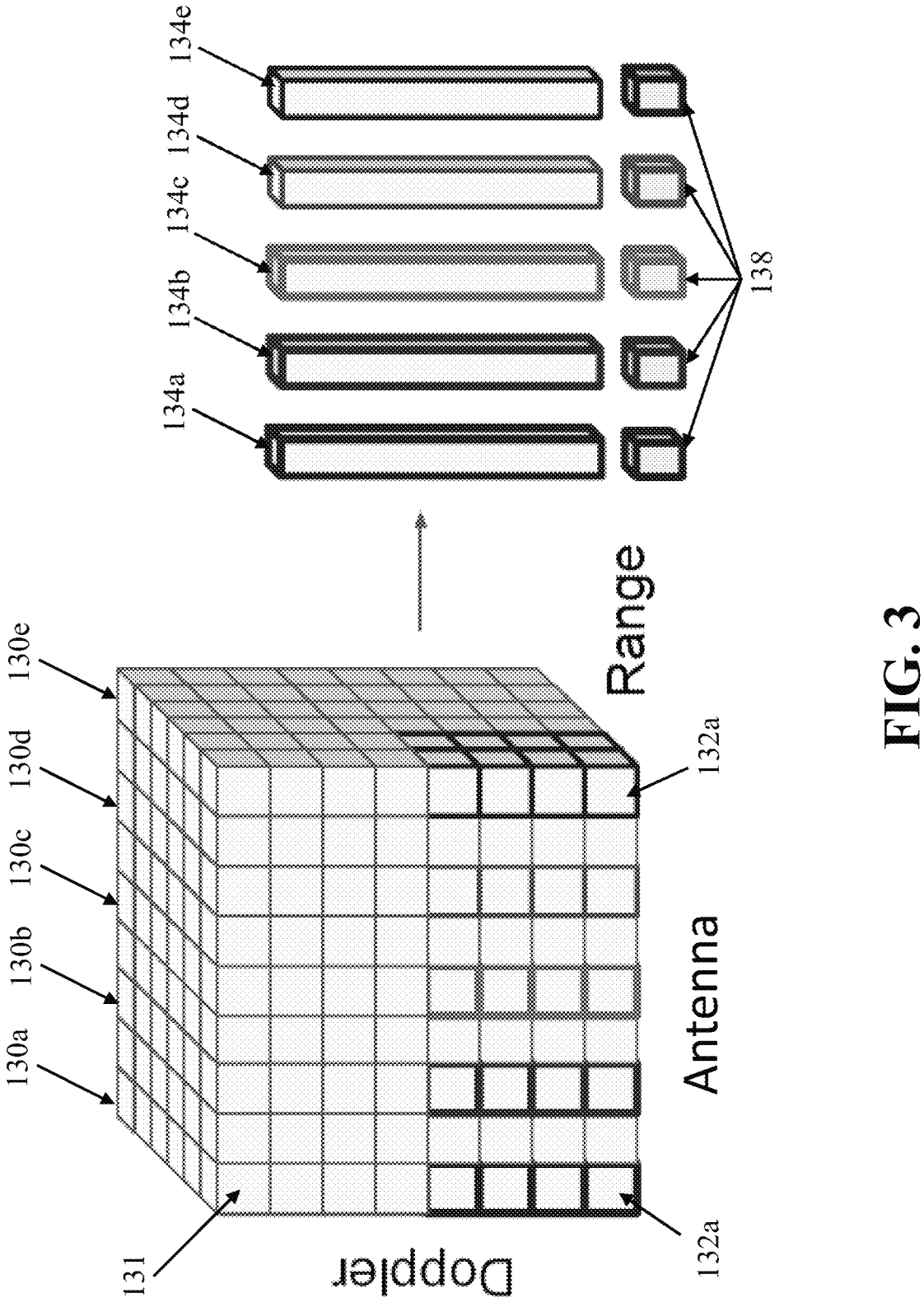
FIG. 3 is an illustrative example depicting generating a first sequence of tokens based upon a first subset of radar tensor data generated a plurality of distributed radar sensors.
Figure 4:
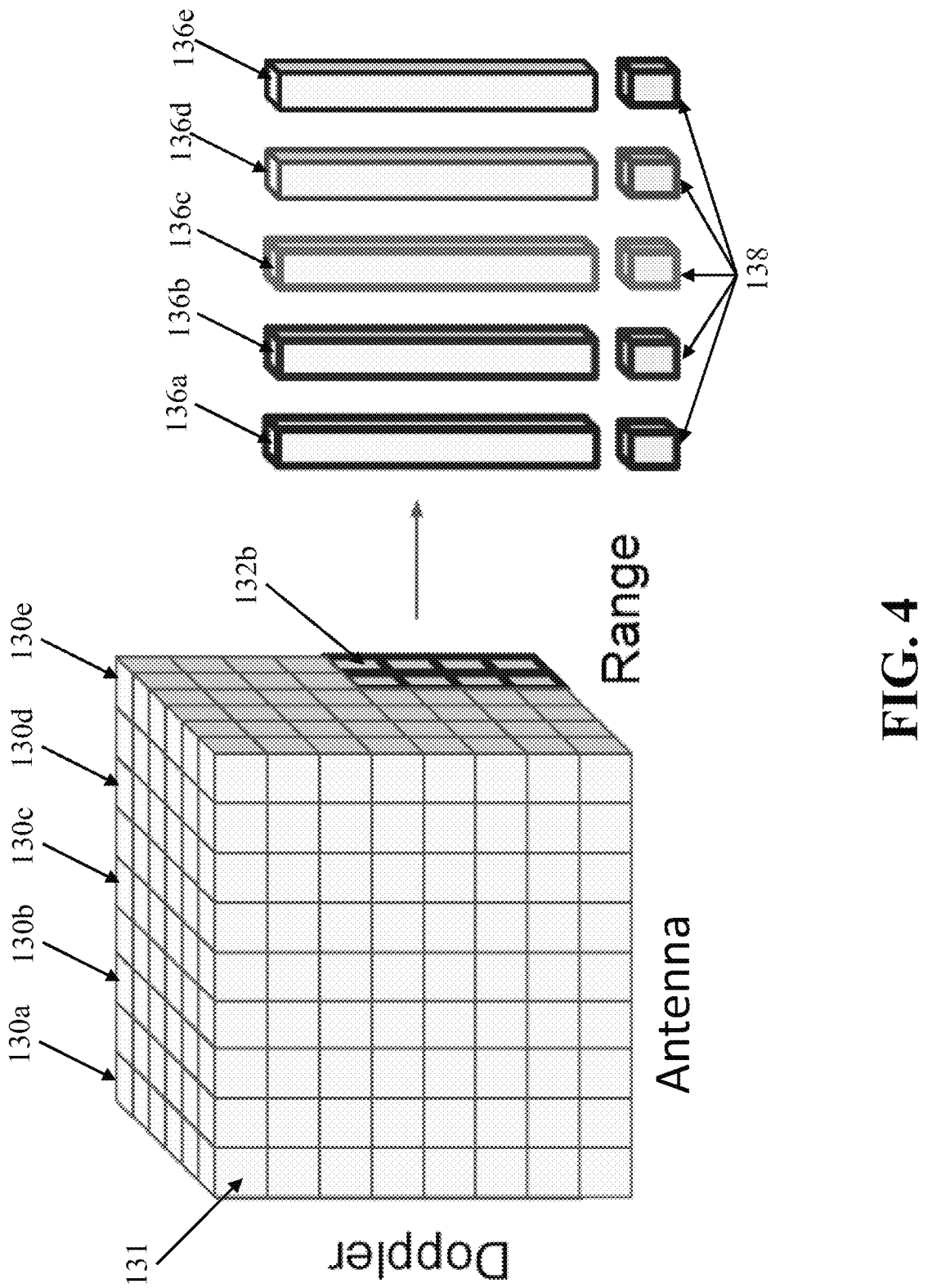
FIG. 4 is an illustrative example depicting generating a second sequence of tokens based upon a second subset of radar tensor data generated by a plurality of distributed radar sensors.

With reference to FIGS. 3 and 4, three-dimensional illustrations are provide illustrating the generation of sequences of tokens from radar tensors generated by the radar sensors 120. The token extractor module 110 is configured to receive tensors 130a-e from the radar system 118 and generate sequences of tokens 132 based upon the values contained in the tensors. As shown, the token extractor module 110 is configured to receive tensors 130a-c containing measurement values based upon detected echo signals from a plurality of antennas 122a-c of radar sensors 120 distributed on and around the platform 100. Each of the tensors 130a-e includes range-Doppler bins, where the bins have values generated from the echo signals detected by one of the antennas 122a-c distributed around the platform 100. In the illustrated embodiment, the tensors 130 correspond to the different distributed antennas 122a-c from which the tensor 130 was generated. However, it will be understood that the radar tensors may contain any suitable radar measurement values and may be in any suitable form.

The token extractor module 110 extracts values from bins of the tensors 130a-130c (and 130d and 130e) and creates sequences of tokens 134a-134e based upon such values, where each value in a sequence of tokens corresponds to: 1) a value in a range-Doppler bin; and 2) an antenna. In the example illustrated in FIG. 3, values from eight range- Doppler bins from tensors associated with five different antennas are extracted from the tensors 130a-130e and used to create five different sequences of tokens. The token extractor module 110 also places a positional embedding with each sequence of tokens, such that a sequence of tokens includes data that identifies the antenna that corresponds to such sequence of tokens.

Accordingly, in the example shown, the tensors include nine separate tensors corresponding to nine different radar antennas, and the tensor extractor module 110 creates 54 different sequences of tokens, with each sequence of tokens corresponding to eight range-Doppler bins (two separate distance ranges and four separate Doppler ranges). That is, each sequence of tokens includes 8 values from range-Doppler bins. The size and number of tensor bins used to create a sequence of tokens may be selected based upon the application of the platform 100, such as the type of platform 100 and/or the environment in which the platform 100 operates.

Referring back to FIG. 1, the token extractor module 110 transmits the generated sequences of tokens based upon the tensor values to the transformer model 112. The transformer model 112 is configured to generate point clouds based upon the sequences of tokens received from the token extractor module 110. The point clouds may be indicative of the environment around the platform 100, such as the detection and position of objects in the environment relative to the platform 100, based upon the radar tensor data subset(s). The transformer model 112 is a machine learning model (pre-trained from annotated training datasets) that generates point clouds based upon the sequences of tokens received from the token extractor module 110.

The transformer model 112 may be trained using a machine learning algorithm for initial or ongoing training using training data from a knowledge base. The knowledge base may comprise training data from a training data repository with ground truth (known real) data and from device-generated data, such as from sequences of values corresponding to tensor bins from tensors generated from the radar sensors 120.

The transformer model 112 is trained to generate one or more point clouds indicative of the platform 100 environment based upon the sequences of tokens generate by the token extractor module 110. The transformer model 112 may be trained using a knowledge base comprising input data based upon sequences of values based upon tensor bins of tensor generated by radar sensors 120 in combination with known real (ground truth) data with known results that are annotated as such. Each radar tensor may provide several training samples. The known real data may contain actual positions of objects in a known scene and may be generated via LIDAR data, such as multiple LIDAR-generated point clouds. The transformer model 112 may be trained to generate a point cloud using measured radar data from two or more sequences of tokens (from different tensor bins) generated from radar tensors. In other words, the transformer model 112 may be trained using a subset of radar tensor data to generate one or more point clouds. The transformer model 112 may be trained using different permutations and combinations of tensor bin data (subsets of radar tensor data) to generate one or more point clouds indicative of the environment around the platform 100. In some implementations, the transformer model 112 is trained to associate the data from multiple radar sensors into an azimuth-range point cloud based on the environment of the platform 100. In other implementations, the transformer model 112 is trained to associate the data from multiple radar sensors into an azimuth-elevation-range point cloud. The transformer model 112 may also be supplementally trained based on the output of the radar sensors 120 relative to the environments in which the platform 100 operates. The supplemental data can also be used to facilitate identification of contents and/or to increase the training set for future application versions or updates to the current application.

Using the knowledge base, the transformer model 112 may also be trained to generate an overall point cloud indicative of the platform 100 environment based upon one or more point clouds generated from the radar values of two or more tensor bins and an additional point cloud and/or additional values from tensor bins. In other words, the transformer model 112 may be trained to combine subsets of tensor data from different radar sensors to generate a point cloud having a higher resolution than a point cloud generated from two subsets of sensor data. The transformer model 112 may be trained to combine subsets of radar sensor data to generate an overall point cloud having substantially the same resolution of the entirety of the environment surrounding the platform 100 as a point cloud generated based upon LIDAR data. The transformer model 112 may be configured to compensate for variations in antenna 122a-c positions, such as due to mounting deviations between vehicles and/or due to movement of the antennas 122a-c during operation of the platform 100, in generating the overall point cloud.

Put differently with respect to training, radar data can be generated as a platform is in operation, and a LIDAR sensor can be employed to generate point clouds that temporally correspond to the radar data. The point cloud has a particular resolution that is associated with the LIDAR sensor. The transformer model 112 is trained such that the LIDAR point clouds are the target of learning, with sequences of tokens (based upon radar tensors) being the inputs. Backpropagation can be employed to train the transformer model 112. The transformer model 112, once trained, can output point clouds having the same resolution as point clouds generated by the LIDAR sensor, which is an improvement relative to conventional radar systems. In other examples, the transformer model 112 can be trained based upon a simulation environment, where simulation is employed to generate radar tensors and is further employed to generate point clouds of any suitable resolution. The point clouds can be the targets of learning, and the transformer model 112 can be trained as referenced above.

Figure 5:
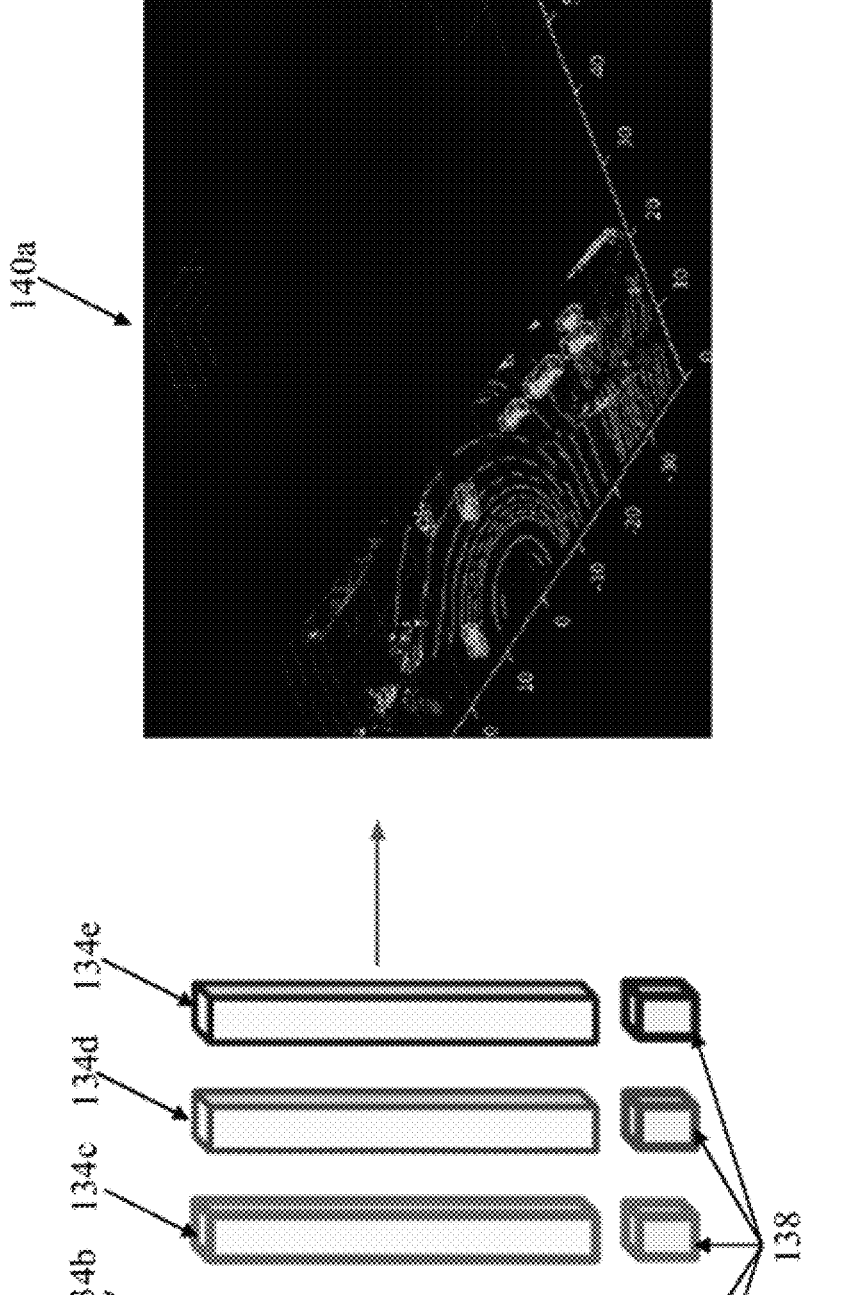
FIG. 5 is an illustrative example depicting generating a point cloud based upon a sequence of tokens extracted from a first subset of radar sensor data.
Figure 6:
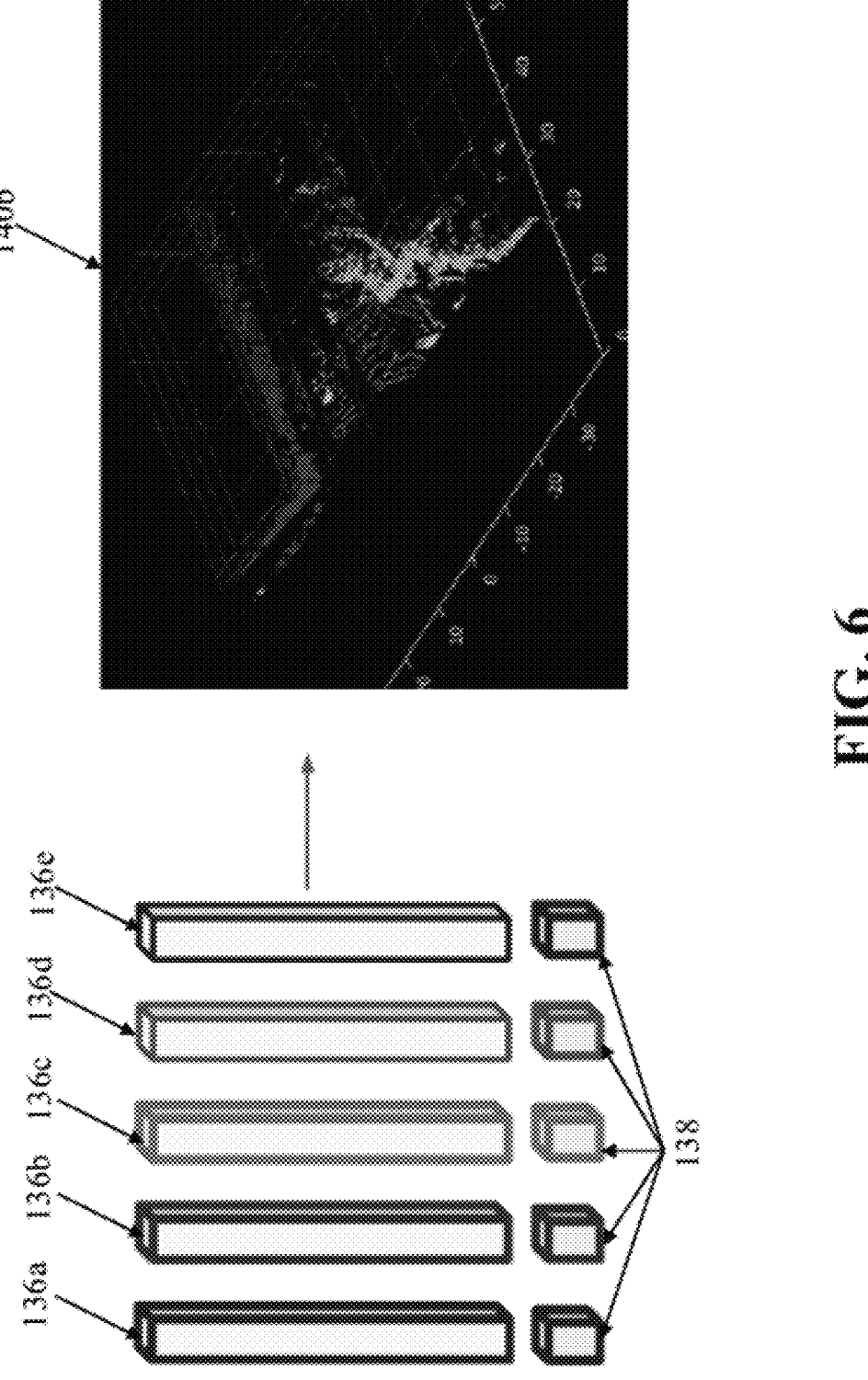
FIG. 6 is an illustrative example depicting generating a point cloud based upon a sequence of tokens extracted from a second subset of radar tensor data.
Figure 7:
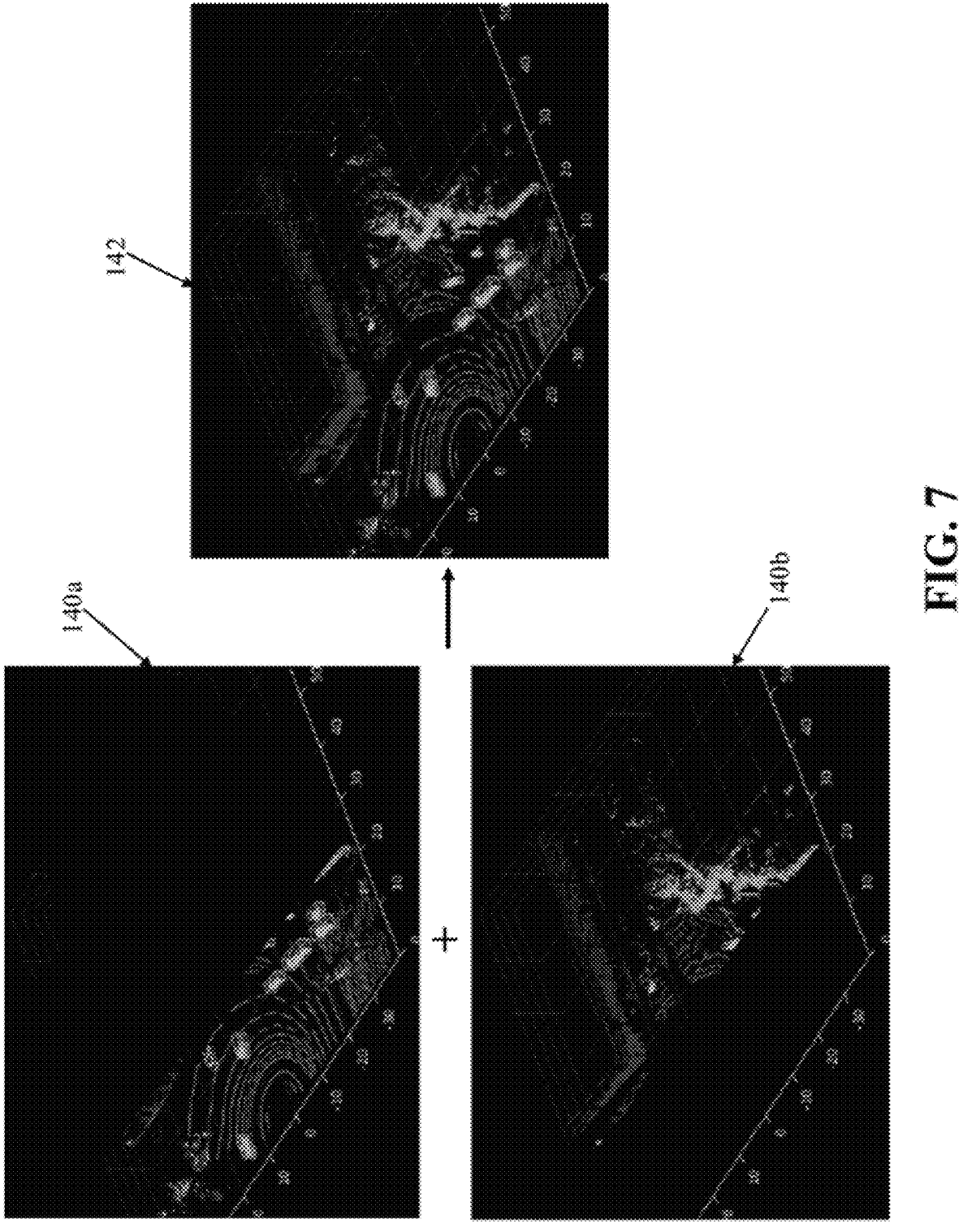
FIG. 7 is an illustrative example depicting generating an overall point cloud based upon the point cloud of FIG. 5 and the point cloud of FIG. 4.

With reference to FIGS. 5-7, the transformer model 112 receives the sequences of tokens generated by the token extractor module 110 (e.g., sequences of tokens 134a-e, 136a-e generated in FIGS. 3-4) as input and generates one or more point clouds based upon such tokens. The transformer model 112 is configured to generate a point cloud based upon two or more sequences of tokens that correspond temporally (from the same time or near the same time). The sequences of tokens may correspond to the same radar measurement range(s) from tensors generated from different distributed antennas 122a-c (e.g., antennas 122a-c at different locations around the platform 100). In some implementations, the transformer model 112 generates a point cloud from sequences of tokens having like encoded identifiers (encoded identifiers having the same tensor bin identifying information). In other words, the transformer model 112 is configured to generate point clouds based upon sequences of tokens generated from the same subset (e.g., same range bin, same range-Doppler bin, etc.) of different radar tensors. The point cloud generated by the transformer model 112 will correspond to the same range of tensor data as the input sequences of tokens and be indicative of the environment as detected by the antennas 122*a-c* from which the sequences of tokens were extracted at the range of tensor data. For example, the transformer model 112 may generate a point cloud for a given range of radar data (e.g., a range of 0-5 meters) based upon the sequences of tokens corresponding to the tensor bins of the same range of radar data (e.g., sequences of tokens generated based on radar tensor data between 0 and 5 meters). The transformer model 112 may be configured and/or trained to generate point clouds based upon sequences of tokens extracted from radar tensors generated from echo signals detected by antennas 122*a-c* at slightly different times and/or based upon sequences of tokens extracted from radar tensors detected echo signals by one or more antennas 122*a-c* that shifted or otherwise moved during operation of the platform 100.

The transformer model 112 may be configured to generate a point cloud corresponding to a range of one or more tensor data/radar values (e.g., range/distance, range-Doppler, etc.) based upon any suitable combination of sequences of tokens extracted from tensor bins corresponding to the same range of tensor data values. In some implementations, the transformer model 112 is configured to generate the point cloud corresponding to a range of one or more tensor data values based upon each of the sequences of tokens extracted from tensor bins corresponding to said range(s) of tensor data values. In other implementations, the transformer model 112 is configured to generate the point cloud corresponding to a range of one or more tensor data values based upon two or more sequences of tokens extracted from tensor bins corresponding to the range(s) of tensor data values and then append said point cloud based upon one or more additional sequences of tokens extracted from other tensor bins corresponding to the same range(s) of tensor data values (e.g., same tensor bins for different antennas 122*a-c*). For example, the transformer model 112 may be configured to generate a point cloud based upon a first and second sequence of tokens extracted from a first tensor (from first antenna 122*a-c* and/or radar sensor 120) and a second tensor (from second antenna 122*a-c* and/or radar sensor 120), the first and second sequences of tokens corresponding to the same range of tensor data/radar values, and then append said point cloud based upon a third sequence of tokens extracted from a third tensor (from third antenna 122*a-c* or radar sensor 120), the third sequence of tokens corresponding to the same range of tensor data/radar values as the first and second tensor bins. The transformer model 112 may append sequences of tokens until the resultant point cloud is indicative of the environment around the platform 100 as detected by each distributed antenna 122*a-c* at the respective range(s) of tensor/radar data (the subset of the radar tensors corresponding to the given tensor bin).

The transformer model 112 is also configured to generate an overall point cloud indicative of the environment of the platform 100 sensed by the radar system 118. The transformer model 112 may be configured to generate the overall point cloud based upon two or more point clouds corresponding to different ranges of tensor data/radar values and/or multiple sequences of tokens corresponding to multiple antennas 122*a*-122*c* and different ranges of tensor data/radar values. The overall point cloud may be based upon temporally corresponding (from the same time or near the same time) sequences of tokens extracted by the token extractor module 110 for each tensor generated from the distributed antennas 122*a-c*. In other words, the overall point cloud may be generated based upon the entirety of the data generated by radar system 118 and may be indicative of the entire portion of the environment sensed and detected (via echo signals) by the radar system 118 (not just a subset of the tensor data). The resulting overall point cloud may have substantially the same resolution as a point cloud generated by Lidar.

The transformer model 112 may be configured to generate the overall point cloud based upon any suitable combination of sequences of tokens extracted from tensor bins corresponding to the different ranges of tensor data values. In some implementations, the transformer model 112 is configured to generate a first point cloud based upon sequences of tokens corresponding to a first tensor bin with a first value range, generate successive point clouds based upon sequences of tokens corresponding to successive bin ranges (e.g., second tensor bin range then third tensor bin range, etc.), and append the generated point clouds into the overall point cloud. In other implementations, the transformer model 112 is configured to generate a first point cloud based upon sequences of tokens corresponding to a first tensor bin range, generate a second point cloud based upon sequences of tokens corresponding to a second tensor bin range, append the second point cloud to the first point cloud, and repeat the process of generating point clouds and appending the generated point clouds until the overall point cloud is generated.

For example, the transformer model 112 may be configured to generate a first point cloud based upon sequences of tokens from first bins of a first tensor and first bins of a second tensor, the first bins of the two tensors corresponding to a same first range. The transformer model 112 may then be configured to generate a second point cloud based upon sequences of tokens from second tensor bins of the first tensor and second tensor bins of the second tensor, the second tensor bins of the first tensor and the second tensor bins of the second tensor corresponding to a same second range (that is adjacent to but non-overlapping with the first range). The transformer model 112 may then be configured to generate an overall point cloud based upon the first and second point clouds, where the overall point cloud includes the first and second point clouds.

By generating point clouds for ranges (subsets) of tensor bins and then appending the point clouds to generate an overall point cloud, the computing system 104 may generate a high-resolution overall point cloud based upon echo signals detected by antennas multiple antennas 122*a-c* (even when the multiple antennas 122*a-c* did not generate radar data at exactly the same time and/or even when the antennas 122*a-c* have shifted due to, for example, vibration of the platform 100. Additionally, by generating point clouds based upon subsets of radar tensor data, the processing constraints and/or time required may be reduced to generate an overall point cloud having a desired resolution. Further, by training the transformer model 112 to generate point clouds based upon subsets of radar data based on varying conditions, the transformer model 112 may compensate for small deviations between platforms 100 (such as platforms 100 within a fleet of platforms 100) and deviations within platforms 100 due to movement of one or more distributed antennas 122*a-c* (such as due to vibrations, flexing, bumps, etc.). The transformer model 112 may generate overall point clouds having a coherent resolution indicative of the environment around the platform 100 without the need for coherent radar sensors 120 and/or antennas 122*a-c*.

FIGS. 5-7 illustrate an example illustration of the generation of an overall point cloud from sequences of tokens (the sequences of tokens 134*a-e*, 136*a-e* generated in FIGS. 3-4). As shown in FIG. 5, the transformer model 112 receives the first sequences of tokens 134*a-e* generated based upon the tensor bins 131 corresponding to the first tensor group 132*a*. The transformer model 112 may also receive (or the sequences of tokens 134*a-e* may contain) the encoded identifier 138 associated with each of the sequences of tokens 134*a-e*. The transformer model 112 then generates a first point cloud 140*a* based upon the first sequences of tokens 134*a-e* and the encoded identifiers 138 associated therewith. The first point cloud 140*a* is indicative of the environment around the platform 100 corresponding to the range(s) of radar values of the tensor bins 131 in the first tensor group 132*a*. In the illustrated embodiment, the first point cloud 140*a* corresponds to lower range (distance) values. However, it will be understood that a first point cloud may correspond to any range of any one or more radar values.

As shown in FIG. 6, the transformer model 112 receives the second sequences of tokens 136*a-e* generated based upon the tensor bins 131 corresponding to the second tensor group 132*b*. The transformer model 112 may also receive (or the sequences of tokens 134*a-e* may contain) the encoded identifier 138 associated with each of the sequences of tokens 136*a-e*. The transformer model 112 then generates a second point cloud 140*b* based upon the second sequences of tokens 136*a-e* and the encoded identifiers 138 associated therewith. The second point cloud 140*b* is indicative of the environment around the platform 100 corresponding to the range(s) of radar values defining the tensor bins 131 in the second tensor group 132*b*. In the illustrated embodiment, the second point cloud 140*b* corresponds to higher range (distance) values. However, it will be understood that a second point cloud may correspond to any range of any one or more radar values.

As shown in FIG. 7, the transformer model 112 generates an overall point cloud 142 based upon the first and second point clouds 140*a*, 140*b*. The transformer model 112 may implement a transformer-based computer model to generate the overall point cloud 142. The overall point cloud 142 may be indicative of the environment around the platform 100 corresponding to the ranges of radar values of the first and second sequences of tokens 134*a-e*, 136*a-e*. In the illustrated example, two point clouds are combined to generate the overall point cloud 142. However, it will be understood that the overall point cloud 142 may be based upon any number of point clouds. The transformer model 112 may also generate the overall point cloud 142 based upon a first point cloud and additional sequences of tokens or based upon sequences of tokens without first generating a point cloud. The transformer model 112 then transmits the overall point cloud (or point cloud(s)) to the perception system 114.

Referring back to FIG. 1, the perception system 114 can receive the point cloud(s) and/or overall point cloud(s) generated by the transformer model 112 as input and perform object detection and tracking based upon the point clouds. The control system 116 of the computing system 104 is configured to generate an output command to cause the mechanical system 102 of the platform 100 to execute an operational maneuver based upon the object detection and tracking performed by the perception system 114.

FIG. 8 illustrates an exemplary methodology 200 relating to generating three-dimensional point clouds based upon radar data output by a distributed radar system. While the methodology is shown as being a series of acts that are performed in sequence, it is to be understood and appreciated that the methodology is not limited by order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

The methodology 200 starts at 202, and at 204 radar signals are emitted into an environment surrounding a platform. The radar signals may be emitted from two or more radar sensors distributed on and/or around the platform to emit radar signals substantially around the platform.

At 206, echo reflections from one or more surfaces in the environment are received. The echo reflections may be detected by one or more receiving antennas of the radar system, such as one or more receiving antennas of two or more radar sensors distributed on and/or around the platform.

At 208, radar tensors are generated based upon the received echo reflections. As described above, the tensors can be M-dimensional. A radar tensor includes multiple bins, with each bin containing data. For instance, the bin can be a range-Doppler bin, where the data is indicative of a likelihood that a target exists at a certain range and Doppler information corresponding to the object. The radar tensor data may also contain information or values based upon other measurements detected based upon the detected echo signals such as velocity, angular, and/or azimuth data.

At 210, data is extracted from bins of the tensors. At 212, sequences of tokens are generated based upon the radar data contained in the tensor bins. As discussed above, the sequences of tokens may be indicative of values contained in each tensor bin of each radar tensor.

At 214, a point cloud is generated based upon two or more sequences of tokens generated in 212 corresponding to the same ranges of measured values contained in the radar tensors. As discussed above, the sequences of tokens may be interpolated or otherwise combined to generate a point cloud indicative of a portion of the environment of the platform. In other words, sequences of tokens corresponding to similar subsets of radar tensor data may be combined to generate a point cloud indicative of the environment corresponding to the subset of radar tensor data. The generation of the point cloud may be performed by a transformer model of the computing system of the platform, which may implement a transformer-based computer model to generate the point cloud.

At 216, an overall point cloud is generated based upon the point cloud generated in 214 and additional sequences of tokens. As discussed above, different sequences of tokens corresponding to tensor data indicative to other segments or portions of the sensed environment may be appended to the point cloud of 216 to obtain an overall point cloud indicative of the environment substantially surrounding the platform. The additional sequences of tokens may correspond to tensor bins corresponding to ranges of measured values different from the original point cloud and/or may correspond to tensors generated from different antennas. The additional sequences of tokens may be appended to the point cloud in any suitable combination. In some implementations, different sequences of tokens (sequences of tokens not used in 214) are appended to the original point cloud in succession to generate the overall point cloud. In other implementations, additional point clouds are generated from combinations of two or more different sequences of tokens and the additional point clouds are appended to the original point cloud to generate the overall point cloud. The appending of the additional sequences of tokens to the point cloud to generate the overall point cloud may be performed by the transformer model of the computing system of the platform.

At 218, object recognition and tracking are performed based upon the overall point cloud. As described above, the overall point cloud may be indicative of one or more objects in the environment from which echo signals reflected. Based upon the overall point cloud generated in 216, objects in the environment can be recognized and tracked.

At 220, an operational maneuver is performed. As described above, based upon the determined positional state of the platform, the computing system may output a command to a mechanical system of the platform such that the platform performs an operational maneuver, including, but not limited to, accelerating, decelerating, braking, turning, steering, reversing, or stopping.

While the above methodology is described as including performing an operational maneuver, it is to be understood that the method 200 may be performed without performing an operational maneuver. For example, step 220 may be optional and the point clouds may be generated and the positional state of the platform may be determined without performing an operational maneuver, such as when the one or more determined positional states do not indicate that an operational maneuver should or needs to be performed.

Various technologies have been disclosed herein, wherein such technologies correspond to at least the following examples.

(A1) In an aspect described herein, a method performed by a computing system includes obtaining first values from a first tensor generated by a first radar sensor, where the first values are extracted from first tensor bins of a first tensor that correspond to a distance range. The method also includes generating a first sequence of tokens based upon the first values. The method additionally includes obtaining second values from a second tensor generated by a second radar sensor, where the second values are extracted from second tensor bins of a second tensor that correspond to the distance range, the first values and the second values temporally corresponding to one another. The method further includes generating a second sequence of tokens based upon the second values. The method also includes providing the first and second sequences of tokens as input to a transformer model, where the transformer model generates a point cloud for the distance range based upon the first sequence of tokens and the second sequence of tokens. The method additionally includes controlling an operation of a mechanical system based upon the point cloud generated by the transformer model.

(A2) In some embodiments of the method of (A1), the first tensor bins are range-Doppler bins and the second tensor bins are range-Doppler bins (A3) In some embodiments of the method of at least one of (A1)-(A2), wherein the first sequence of tokens comprises a first encoded identifier corresponding to the first radar sensor and the second sequence of tokens comprises a second encoded identifier corresponding to the second radar sensor.

(A4) In some embodiments of the method of at least one of (A1)-(A3), the transformer model is trained based upon LIDAR data and data generated by the first and second radar sensors.

(A5) In some embodiments of the method of at least one of (A1)-(A4), the method also includes obtaining third values from the first tensor, where the third values are extracted from third tensors bins of the first tensor that correspond to a second distance range. The method additionally includes generating a third sequence of tokens based upon the third values. The method further includes obtaining fourth values from the second tensor, where the fourth values are extracted from fourth tensor bins of the second tensor that corresponds to the second distance range, the third and fourth values temporally corresponding to one another. The method also includes generating a fourth sequence of tokens based upon the fourth values. The method additionally includes providing the third and fourth sequences of tokens as input to the transformer model, where the transformer model generates a second point cloud for the second distance range based upon the third and fourth sequences of tokens.

(A6) In some embodiments of the method of (A5), the distance range and the second distance range are adjacent and non-overlapping. Further, the transformer model generates an overall point cloud by appending the point cloud and the second point cloud.

(A7) In some embodiments of the method of at least one of (A1)-(A4), the method also includes obtaining third values from a third tensor generated by a third radar sensor, where the third values are extracted from third tensor bins that correspond to the distance range. The method further includes generating a third sequence of tokens based upon the third values. The method additionally includes providing the third sequence of tokens as input to the transformer model, where the transformer model generates the point cloud based upon the third sequence of tokens.

(B1) In another aspect, a method performed by a computing system that is in communication with a distributed radar system is described herein, where the method includes obtaining first values from a first tensor generated by a first radar sensor in the distributed radar system, where the first values are extracted from first tensor bins of a first tensor that correspond to a distance range. The method also includes generating a first sequence of tokens based upon the first values. The method additionally includes obtaining second values from a second tensor generated by a second radar sensor of the distributed radar system, where the second values are extracted from second tensor bins of a second tensor that correspond to the distance range, the first values and the second values temporally corresponding to one another. The method further includes generating a second sequence of tokens based upon the second values. The method also includes providing the first and second sequences of tokens as input to a transformer model, where the transformer model generates a point cloud for the distance range based upon the first sequence of tokens and the second sequence of tokens. The method additionally includes controlling an operation of a mechanical system based upon the point cloud generated by the transformer model.

(B2) In some embodiments of the method of (B1), the first tensor bins are range-Doppler bins and the second tensor bins are range-Doppler bins.

(B3) In some embodiments of the method of at least one of (B1)-(B2), the first sequence of tokens comprises a first encoded identifier corresponding to the first radar sensor and the second sequence of tokens comprises a second encoded identifier corresponding to the second radar sensor.

(B4) In some embodiments of the method of at least one of (B1)-(B3), transformer model is trained based upon LIDAR data and data generated by the first and second radar sensors.

(B5) In some embodiments of the method of at least one of (B1)-(B4), the method also includes obtaining third values from the first tensor, where the third values are extracted from third tensors bins of the first tensor that correspond to a second distance range. The method additionally includes generating a third sequence of tokens based upon the third values. The method further includes obtaining fourth values from the second tensor, where the fourth values are extracted from fourth tensor bins of the second tensor that corresponds to the second distance range, the third and fourth values temporally corresponding to one another. The method also includes generating a fourth sequence of tokens based upon the fourth values. The method additionally includes providing the third and fourth sequences of tokens as input to the transformer model, where the transformer model generates a second point cloud for the second distance range based upon the third and fourth sequences of tokens.

(B6) In some embodiments of the method of (B5), the distance range and the second distance range are adjacent and non-overlapping. Further, the transformer model generates an overall point cloud by appending the point cloud and the second point cloud.

(B7) In some embodiments of the method of at least one of (B1)-(B4), the method also includes obtaining third values from a third tensor generated by a third radar sensor, where the third values are extracted from third tensor bins that correspond to the distance range. The method additionally includes generating a third sequence of tokens based upon the third values. The method further includes providing the third sequence of tokens as input to the transformer model, where the transformer model generates the point cloud based upon the third sequence of tokens.

(C1) In yet another aspect, a method is disclosed herein, where the method id performed by a computing system that is included in a platform, where the platform also includes a mechanical system. The platform additionally includes a distributed radar system, the distributed radar system comprising a first radar sensor with a first antenna and a second radar sensor with a second antenna. The method includes obtaining first values from a first tensor generated by the first radar sensor, where the first values are extracted from first tensor bins of a first tensor that correspond to a distance range. The method also includes generating a first sequence of tokens based upon the first values. The method additionally includes obtaining second values from a second tensor generated by the second radar sensor, where the second values are extracted from second tensor bins of a second tensor that correspond to the distance range, the first values and the second values temporally corresponding to one another. The method further includes generating a second sequence of tokens based upon the second values. The method also includes providing the first and second sequences of tokens as input to a transformer model, where the transformer model generates a point cloud for the distance range based upon the first sequence of tokens and the second sequence of tokens. The method additionally includes controlling an operation of the mechanical system based upon the point cloud generated by the transformer model.

(C2) In some embodiments of the method of (C1), the platform is an autonomous vehicle.

(C3) In some embodiments of the method of at least one of (C1)-(C2), the transformer model is trained based upon LIDAR data and data generated by the first and second radar sensors.

(C4) In some embodiments of the method of at least one of (C1)-(C3), the operational maneuver comprises at least one of accelerating, decelerating, braking, turning, steering, reversing, or stopping.

(C5) In some embodiments of the method of at least one of (C1)-(C4), the platform further comprises a positional and/or inertial sensor, and further where the operation of the mechanical system is controlled based upon output of the positional and/or inertial sensor.

(C6) In some embodiments of the method of at least one of (C1)-(C5), the method also includes obtaining third values from the first tensor, where the third values are extracted from third tensors bins of the first tensor that correspond to a second distance range. The method additionally includes generating a third sequence of tokens based upon the third values. The method further includes obtaining fourth values from the second tensor, where the fourth values are extracted from fourth tensor bins of the second tensor that corresponds to the second distance range, the third and fourth values temporally corresponding to one another. The method also includes generating a fourth sequence of tokens based upon the fourth values. The method additionally includes providing the third and fourth sequences of tokens as input to the transformer model, where the transformer model generates a second point cloud for the second distance range based upon the third and fourth sequences of tokens.

(D1) In still yet another aspect, a computing system includes a processor and memory, where the memory stores instructions that, when executed by a processor, cause the processor to perform any of the methods disclosed herein (e.g., any of (A1)-(A7), (B1)-(B7), or (C1-C6)).

(E1) In another aspect, a platform includes a mechanical system. The platform also includes a distributed radar system, where the distributed radar system includes a first radar sensor with a first antenna and a second radar sensor with a second antenna. The platform also includes a computing system that is in communication with the radar system and the mechanical system, wherein the computing system is configured to perform any of the methods disclosed herein (e.g., any of (A1)-(A7), (B1)-(B7), or (C1-C6)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
obtaining first values from a first tensor generated by a first radar sensor, where the first values are extracted from first tensor bins of the first tensor that correspond to a distance range;
generating a first sequence of tokens based upon the first values;
obtaining second values from a second tensor generated by a second radar sensor, where the second values are extracted from second tensor bins of the second tensor that correspond to the distance range, the first values and the second values temporally corresponding to one another;
generating a second sequence of tokens based upon the second values;
providing the first and second sequences of tokens as input to a transformer model, where the transformer model generates a point cloud for the distance range based upon the first sequence of tokens and the second sequence of tokens; and
controlling an operation of a mechanical system based upon the point cloud generated by the transformer model.

2. The computing system of claim 1, wherein the first tensor bins are range-Doppler bins and the second tensor bins are range-Doppler bins.

3. The computing system of claim 1, wherein the first sequence of tokens comprises a first encoded identifier corresponding to the first radar sensor and the second sequence of tokens comprises a second encoded identifier corresponding to the second radar sensor.

4. The computing system of claim 1, wherein the transformer model is trained based upon LIDAR data and data generated by the first and second radar sensors.

5. The computing system of claim 1, the acts further comprising:
obtaining third values from the first tensor, where the third values are extracted from third tensors bins of the first tensor that correspond to a second distance range;
generating a third sequence of tokens based upon the third values;
obtaining fourth values from the second tensor, where the fourth values are extracted from fourth tensor bins of the second tensor that corresponds to the second distance range, the third and fourth values temporally corresponding to one another;
generating a fourth sequence of tokens based upon the fourth values; and
providing the third and fourth sequences of tokens as input to the transformer model, where the transformer model generates a second point cloud for the second distance range based upon the third and fourth sequences of tokens.

6. The computing system of claim 5, where the distance range and the second distance range are adjacent and non-overlapping; and further where the transformer model generates an overall point cloud by appending the point cloud and the second point cloud.

7. The computing system of claim 1, the acts further comprising:
obtaining third values from a third tensor generated by a third radar sensor, where the third values are extracted from third tensor bins that correspond to the distance range;
generating a third sequence of tokens based upon the third values; and
providing the third sequence of tokens as input to the transformer model, where the transformer model generates the point cloud based upon the third sequence of tokens.

8. A method performed by a computing system that is in communication with a distributed radar system, the method comprising:
obtaining first values from a first tensor generated by a first radar sensor in the distributed radar system, where the first values are extracted from first tensor bins of the first tensor that correspond to a distance range;
generating a first sequence of tokens based upon the first values;
obtaining second values from a second tensor generated by a second radar sensor of the distributed radar system, where the second values are extracted from second tensor bins of the second tensor that correspond to the distance range, the first values and the second values temporally corresponding to one another;
generating a second sequence of tokens based upon the second values;
providing the first and second sequences of tokens as input to a transformer model, where the transformer model generates a point cloud for the distance range based upon the first sequence of tokens and the second sequence of tokens; and
controlling an operation of a mechanical system based upon the point cloud generated by the transformer model.

9. The method of claim 8, wherein the first tensor bins are range-Doppler bins and the second tensor bins are range-Doppler bins.

10. The method of claim 8, wherein the first sequence of tokens comprises a first encoded identifier corresponding to the first radar sensor and the second sequence of tokens comprises a second encoded identifier corresponding to the second radar sensor.

11. The method of claim 8, wherein the transformer model is trained based upon LIDAR data and data generated by the first and second radar sensors.

12. The method of claim 8, further comprising:

obtaining third values from the first tensor, where the third values are extracted from third tensors bins of the first tensor that correspond to a second distance range;

generating a third sequence of tokens based upon the third values;

obtaining fourth values from the second tensor, where the fourth values are extracted from fourth tensor bins of the second tensor that corresponds to the second distance range, the third and fourth values temporally corresponding to one another;

generating a fourth sequence of tokens based upon the fourth values; and providing the third and fourth sequences of tokens as input to the transformer model, where the transformer model generates a second point cloud for the second distance range based upon the third and fourth sequences of tokens.

13. The method of claim 12, wherein the where the distance range and the second distance range are adjacent and non-overlapping; and wherein the transformer model generates an overall point cloud by appending the point cloud and the second point cloud.

14. The method of claim 8, further comprising:

obtaining third values from a third tensor generated by a third radar sensor, where the third values are extracted from third tensor bins that correspond to the distance range;

generating a third sequence of tokens based upon the third values; and providing the third sequence of tokens as input to the transformer model, where the transformer model generates the point cloud based upon the third sequence of tokens.

15. A platform comprising:

a mechanical system;

a distributed radar system, the distributed radar system comprising a first radar sensor with a first antenna and a second radar sensor with a second antenna; and a computing system that is in communication with the radar system and the mechanical system, wherein the computing system is configured to perform acts comprising:

obtaining first values from a first tensor generated by the first radar sensor, where the first values are extracted from first tensor bins of the first tensor that correspond to a distance range;

generating a first sequence of tokens based upon the first values;

obtaining second values from a second tensor generated by the second radar sensor, where the second values are extracted from second tensor bins of the second tensor that correspond to the distance range, the first values and the second values temporally corresponding to one another;

generating a second sequence of tokens based upon the second values;

providing the first and second sequences of tokens as input to a transformer model, where the transformer model generates a point cloud for the distance range based upon the first sequence of tokens and the second sequence of tokens; and controlling an operation of the mechanical system based upon the point cloud generated by the transformer model.

16. The platform of claim 15, where the platform is an autonomous vehicle.

17. The platform of claim 15, wherein the transformer model is trained based upon LIDAR data and data generated by the first and second radar sensors.

18. The platform of claim 15, wherein the operational maneuver comprises at least one of accelerating, decelerating, braking, turning, steering, reversing, or stopping.

19. The platform of claim 15, wherein the platform further comprises a positional and/or inertial sensor, and further where the operation of the mechanical system is controlled based upon output of the positional and/or inertial sensor.

20. The platform of claim 15, the acts further comprising:

obtaining third values from the first tensor, where the third values are extracted from third tensors bins of the first tensor that correspond to a second distance range;

generating a third sequence of tokens based upon the third values;

obtaining fourth values from the second tensor, where the fourth values are extracted from fourth tensor bins of the second tensor that corresponds to the second distance range, the third and fourth values temporally corresponding to one another;

generating a fourth sequence of tokens based upon the fourth values; and providing the third and fourth sequences of tokens as input to the transformer model, where the transformer model generates a second point cloud for the second distance range based upon the third and fourth sequences of tokens.

* * * * *